US009960839B2

(12) United States Patent
Jung

(10) Patent No.: US 9,960,839 B2
(45) Date of Patent: May 1, 2018

(54) METHOD AND APPARATUS FOR TRANSMITTING AND RECEIVING REFERENCE SIGNAL IN MOBILE COMMUNICATION SYSTEM USING BEAMFORMING

(71) Applicant: Samsung Electronics Co., Ltd, Gyeonggi-do (KR)

(72) Inventor: Jung-Soo Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 13/903,612

(22) Filed: May 28, 2013

(65) Prior Publication Data

US 2013/0315083 A1    Nov. 28, 2013

(30) Foreign Application Priority Data

May 25, 2012 (KR) .......................... 10-2012-0056173

(51) Int. Cl.
*H04B 7/26* (2006.01)
*H04W 56/00* (2009.01)

(52) U.S. Cl.
CPC .............. *H04B 7/26* (2013.01); *H04W 56/00* (2013.01)

(58) Field of Classification Search
CPC ....... H04B 7/02; H04B 7/0617; H04W 52/02; H04W 24/02
USPC ....... 370/252, 328, 329, 330, 335, 342, 343, 370/345, 436, 441, 442
See application file for complete search history.

(56) References Cited

U.S. PATENT DOCUMENTS

| 2002/0146983 | A1* | 10/2002 | Scherzer et al. ............. 455/67.1 |
| 2003/0119559 | A1 | 6/2003 | Chitrapu |
| 2005/0215289 | A1 | 9/2005 | Rensburg et al. |
| 2006/0104382 | A1 | 5/2006 | Yang et al. |
| 2007/0049324 | A1* | 3/2007 | Sambhwani et al. ......... 455/525 |
| 2007/0121751 | A1 | 5/2007 | Li et al. |
| 2010/0075705 | A1 | 3/2010 | van Rensburg et al. |
| 2010/0246527 | A1* | 9/2010 | Montojo et al. .............. 370/330 |

(Continued)

FOREIGN PATENT DOCUMENTS

| CN | 101095333 | 12/2007 |
| CN | 101297584 | 10/2008 |

(Continued)

OTHER PUBLICATIONS

International Search Report dated Sep. 25, 2013 in connection with International Patent Application No. PCT/KR2013/004609, 4 pages.

(Continued)

*Primary Examiner* — Ricky Ngo
*Assistant Examiner* — Stephen Steiner

(57) ABSTRACT

A method for transmitting a reference signal by a Base Station (BS) in a mobile communication system using beamforming includes determining beamforming information for transmission of a Reference Signal (RS) Transmit (Tx) beam, wherein at least one of a Tx period and a beam width of the RS Tx beam is determined differently based on a size of Receive (Rx) areas in which a plurality of Tx beams are received in coverage of the BS; and transmitting the RS Tx beam to related Rx areas depending on the determined beamforming information.

56 Claims, 12 Drawing Sheets

(56) References Cited

U.S. PATENT DOCUMENTS

2013/0235807 A1* 9/2013 Lee et al. .................. 370/329
2013/0331081 A1* 12/2013 Rune et al. ................ 455/418

FOREIGN PATENT DOCUMENTS

CN       101895486      11/2010
CN       102202330       9/2011
WO    2009102124 A2     8/2009

OTHER PUBLICATIONS

Written Opinion of International Searching Authority dated Sep. 25, 2013 in connection with International Patent Application No. PCT/KR2013/004609, 7 pages.
First Office Action dated Nov. 14, 2016 in connection with Chinese Application No. 2013800274537, 19 pages.

* cited by examiner

METHOD AND APPARATUS FOR TRANSMITTING AND RECEIVING REFERENCE SIGNAL IN MOBILE COMMUNICATION SYSTEM USING BEAMFORMING

CROSS-REFERENCE TO RELATED APPLICATION(S) AND CLAIM OF PRIORITY

The present application is related to and claims the benefit under 35 U.S.C. § 119(a) of a Korean Patent Application filed in the Korean Intellectual Property Office on May 25, 2012 and assigned Serial No. 10-2012-0056173, the entire disclosure of which is incorporated herein by reference.

TECHNICAL FIELD

The present disclosure relates generally to a method and apparatus for transmitting and receiving reference signals in a mobile communication system, and more particularly, to a method and apparatus for efficiently transmitting and receiving reference signals in a mobile communication system using beamforming.

BACKGROUND

Due to the increasing popularity of terminals or Mobile Stations (MSs) such as smart phones, the average amount of data consumed by mobile users has exponentially increased, and the users' demands for higher data rates have also constantly increased.

Generally, a method for providing a high data rate in a mobile communication system may be divided into a method of using a wider frequency band to provide communication, and a method of increasing the frequency use efficiency. It is very difficult to provide a higher average data rate with the latter method, because the communication technologies of the current generation already support the frequency use efficiency close to its theoretical limit, making it difficult to further increase the frequency use efficiency by improving the technologies.

Therefore, a more feasible way to increase the data rate is to provide data services over a wider frequency band. In this case, available frequency bands need to be considered. In the current frequency distribution policy, available broadband communication bands of 1 GHz or more are limited, and the actually available frequency bands include only the millimeter wave (mmW) bands of 30 GHz or more. In these high frequency bands, unlike in the 2 GHz band used by the certain cellular systems, signals are significantly attenuated depending on the distance. Due to the signal attenuation, in the case of a Base Station (BS) that uses the same power as that of certain cellular systems, its service coverage is significantly decreased. In order to solve these and other problems and disadvantages, the beamforming technique is widely used to increase the transmission/reception efficiency of an antenna by concentrating transmit/receive power in a narrow space.

FIG. 1 illustrates a mobile communication system including a MS and a BS that provides beamforming using array antennas.

Referring to FIG. 1, a BS 110 transmits data in each of cells (or sectors) 101, 103 and 105 using a plurality of array antennas Array0 and Array1 by switching the direction of a Downlink (DL) Transmit (Tx) beam 111. An MS 130 also receives the data by switching the direction of a Receive (Rx) beam 131.

In the mobile communication system that performs communication using the beamforming technique, the BS 110 and the MS 130 provide data services by selecting the direction of a Tx beam and the direction of an Rx beam, which show the optimal channel environment, from among a variety of directions of the Tx beam and the Rx beam. The beamforming technique may be equally applied not only to a DL channel carrying data from the BS 110 to the MS 130, but also to an Uplink (UL) channel carrying data from the MS 130 to the BS 110.

In the beamforming technique, if it is assumed that the number of directions of a Tx beam, in which the BS 110 can transmit data, is N, and the number of directions of an Rx beam, in which the MS 130 can receive data, is M, the simplest way to select the optimal DL Tx/Rx direction is that the BS 110 transmits a predetermined signal in each of N available Tx beam directions at least M times, and the MS 130 receives each of N Tx beams using M Rx beams. In this method, the BS 110 needs to transmit a specific reference signal at least N×M times, and the MS 130 receives the reference signal N×M times and measures signal strength of the received reference signal. The MS 130 determines, as the optimal Tx/Rx beam direction, the direction that shows the highest measured signal strength among the N×M measured signal strengths.

As such, the process of transmitting a signal in all possible Tx directions by the BS 110 at least once is called a beam sweeping process, and the process of selecting an optimal Tx/Rx beam direction by the MS 130 is called a beam selection process. This optimal DL Tx/Rx beam selection process may be equally applied even to a UL Tx/Rx process of transmitting data from the MS 130 to the BS 110.

In the common cellular system, a BS transmits a DL reference signal using specific wireless resources reserved for a Sync Channel (SCH) or a reference signal. This DL reference signal is repeatedly transmitted more than once using sufficient transmit power so that all MSs existing in the coverage of the BS receive the DL reference signal. In the mobile communication system that performs communication using the beamforming technique like in FIG. 1, in order to transmit a DL reference signal throughout its coverage, the BS needs to transmit the DL reference signal in all possible Tx directions more than once using the above-described beam sweeping method. The number of transmissions, which is required to transmit a DL reference signal by beam sweeping, is proportional to the number of Tx beams existing in the coverage of the BS 110.

FIG. 2 illustrates a beam width, an elevation angle, and an azimuth in a mobile communication system using beamforming.

It will be assumed in FIG. 2 that a BS 210 is installed in a location having a height 201 of, for example, a building from the ground, and has a predetermined beam width 205. The beam width 205 of the BS 210 can be defined for each of the elevation angle and the azimuth. Generally, the elevation angle refers to an angle (for example, an angle between an antenna and the ground) at which an antenna for transmitting and receiving radio waves sees the satellite. In the example of FIG. 2, since an antenna of the BS 210 looks down at the ground, its elevation angle 203 is construed as an angle between a Tx beam and the vertical surface of the building on which the BS 210 is installed. Although not illustrated in FIG. 2, the azimuth can be construed as an angle of the horizontal direction in which the Tx beam is propagated.

FIG. 3 illustrates an example of a range that a Tx beam reaches depending on the elevation angle in a mobile communication system using beamforming.

It will be assumed in FIG. 3 that a BS 310 is installed on, for example, a building as described in FIG. 2, and has an installation height of, for example, 35 m and the coverage of a radius of about 200 m.

As illustrated in FIG. 3, in the absence of obstacles, a Tx beam transmitted by the BS 310 is transmitted up to a distance of 20 m within the coverage of the BS 310 if its elevation angle is, for example, 25° (see 301); the Tx beam is transmitted up to a distance of 42 m if its elevation angle is 50° (see 303); the Tx beam is transmitted up to a distance of 96 m if its elevation angle is 65° (see 305); and the Tx beam is transmitted up to a distance of 198 m if its elevation angle is 75° (see 307). It can be understood from the example of FIG. 3 that the Tx beam transmitted by the BS 310 reaches up to the farther area as its elevation angle is larger, and as the Tx beam is transmitted farther from the BS 310, its reach is longer and it can be received in the wider area.

FIG. 4 illustrates the number of Tx beams that can be used by a BS depending on the elevation angle and the azimuth.

Specifically, FIG. 4 illustrates the number of Tx beams that can be transmitted by a BS 410, under the assumption that the BS 410 is installed on, for example, a building like in FIG. 2, and the BS 410 is installed at the height of, for example, 35 m, and transmits a Tx beam having a beam width of 5° with respect to each of the elevation angle and the azimuth in one sector having an angle of 30° and coverage of 200 m.

In the example of FIG. 4, since the number of Tx beams that can be transmitted by the BS 410 is a product of 16 elevation-angle Tx directions in units of 5° and 6 azimuth Tx directions in units of 5° for each elevation-angle Tx direction, and is 96 in total, the total number of possible Tx directions of the Tx beams is 96.

Although a Tx beam transmitted by a BS is spread in the form of a sector (or fan) as illustrated in FIG. 3, for the convenience purposes, it is assumed in the example of FIG. 4 that each Tx beam reaches the ground in the form of a rectangle. In FIG. 4, the rectangles mean 96 areas where a Tx beam having specific azimuth and elevation angle has reached the ground. As described in conjunction with FIG. 3, the mean 96 Tx beams are transmitted up to the farther region as their elevation angle is greater, and as the Tx beams are transmitted farther from the BS, their reach is longer and they are received in the wider area. A ratio written in each rectangle represents the ratio of a reception (Rx) area of the Tx beam transmitted to the location of the rectangle, to a total of 96 areas, in terms of the size. It can be understood that as illustrated in FIG. 4, even for a Tx beam having the same beam width, a Tx beam that is transmitted to the region close to the boundary area of the BS is received in the much wider area depending on the elevation angle and azimuth, compared to a Tx beam that is transmitted to the region close to the central area of the BS. A simulation showed that in the example of FIG. 4, where the BS has a height of 35 m and the coverage of 200 m, there is a size difference of a maximum of 480 times between Rx areas of a Tx beam.

As illustrated in the example of FIG. 4, if a Tx beam having the elevation angle and azimuth of a narrow beam width is used, a plurality of possible Tx beams and Rx areas exist in the coverage of the BS. In the example of FIG. 4, the BS needs to repeatedly transmit a DL reference signal at least 96 times, if it transmits a DL reference signal more than once in all possible Tx directions by beam sweeping. Since the number of transmissions required to transmit a DL reference signal by beam sweeping is proportional to the number of Tx beams available in the coverage of the BS, the simplest way to reduce the Tx overhead of the DL reference signal in the BS of FIG. 4 is to support the full coverage of the BS with a lesser number of Tx beams. To this end, each Tx beam needs to have a wider beam width. For example, in order to support a sector of 60° with two Tx beams, each Tx beam needs to have a beam width of about 30°.

Generally, however, as a Tx beam has a wider beam width, its beamforming effects are lower in proportion thereto. In other words, as a beam width is narrower, the beamforming effects are higher. If a beam width is reduced to increase the beamforming effects, the number of Tx beams needed to support one BS area increases according to the beam width reduction, causing an increase in the overhead needed to transmit a DL reference signal. As such, the beamforming effects and the transmission overhead have a trade-off relationship with each other.

The above information is presented as background information only to assist with an understanding of the present disclosure. No determination has been made, and no assertion is made, as to whether any of the above might be applicable with regard to the present disclosure.

SUMMARY

To address the above-discussed deficiencies, embodiments of the present disclosure include a method and apparatus for efficiently transmitting and receiving a Downlink (DL) reference signal in a mobile communication system using beamforming.

Certain embodiments of the present disclosure include a method and apparatus for efficiently transmitting and receiving a DL reference signal by adjusting a beam width of a Transmit (Tx) beam in a mobile communication system using beamforming.

Certain embodiments of the present disclosure include a method and apparatus for efficiently transmitting and receiving a DL reference signal by adjusting a Tx period of a Tx beam in a mobile communication system using beamforming.

Certain embodiments of the present disclosure include a method for transmitting a reference signal by a Base Station (BS) in a mobile communication system using beamforming. The method includes determining beamforming information for transmission of a Reference Signal (RS) Transmit (Tx) beam, wherein at least one of a Tx period and a beam width of the RS Tx beam is determined differently based on a size of Receive (Rx) areas in which a plurality of Tx beams are received in coverage of the BS; and transmitting the RS Tx beam to related Rx areas depending on the determined beamforming information.

Certain embodiments of the present disclosure include a method for receiving a reference signal transmitted from a Base Station (BS) by a Mobile Station (MS) in a mobile communication system using beamforming. The method includes acquiring beamforming information for transmission of a Reference Signal (RS) Transmit (Tx) beam, wherein at least one of a Tx period and a beam width of the RS Tx beam is determined differently based on a size of Receive (Rx) areas in which a plurality of Tx beams are received in coverage of the BS; and receiving at least one RS Tx beam including the reference signal using the acquired beamforming information.

Certain embodiments of the present disclosure include a Base Station (BS) for transmitting a reference signal in a mobile communication system using beamforming. The BS includes a transmitter for transmitting a Reference Signal (RS) Transmit (Tx) beam including the reference signal and a data Tx beam including data corresponding to the reference signal; and a controller for determining beamforming information for transmission of the RS Tx beam, wherein at least one of a Tx period and a beam width of the RS Tx beam is determined differently based on a size of Receive (Rx) areas in which a plurality of Tx beams are received in coverage of the BS, and controlling the transmitter to transmit the RS Tx beam to related Rx areas depending on the determined beamforming information.

Certain embodiments of the present disclosure include a Mobile Station (MS) for receiving a reference signal transmitted from a Base Station (BS) in a mobile communication system using beamforming. The MS includes a receiver for receiving, from the BS, beamforming information and a Reference Signal (RS) Transmit (Tx) beam generated based on the beamforming information, wherein at least one of a Tx period and a beam width of the RS Tx beam is determined differently based on a size of Receive (Rx) areas in which a plurality of Tx beams are received in coverage of the BS; and a controller for receiving the beamforming information from the BS, and controlling the receiver to receive at least one RS Tx beam including the reference signal using the received beamforming information.

Other aspects, advantages, and salient features of the disclosure will become apparent to those skilled in the art from the following detailed description, which, taken in conjunction with the drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
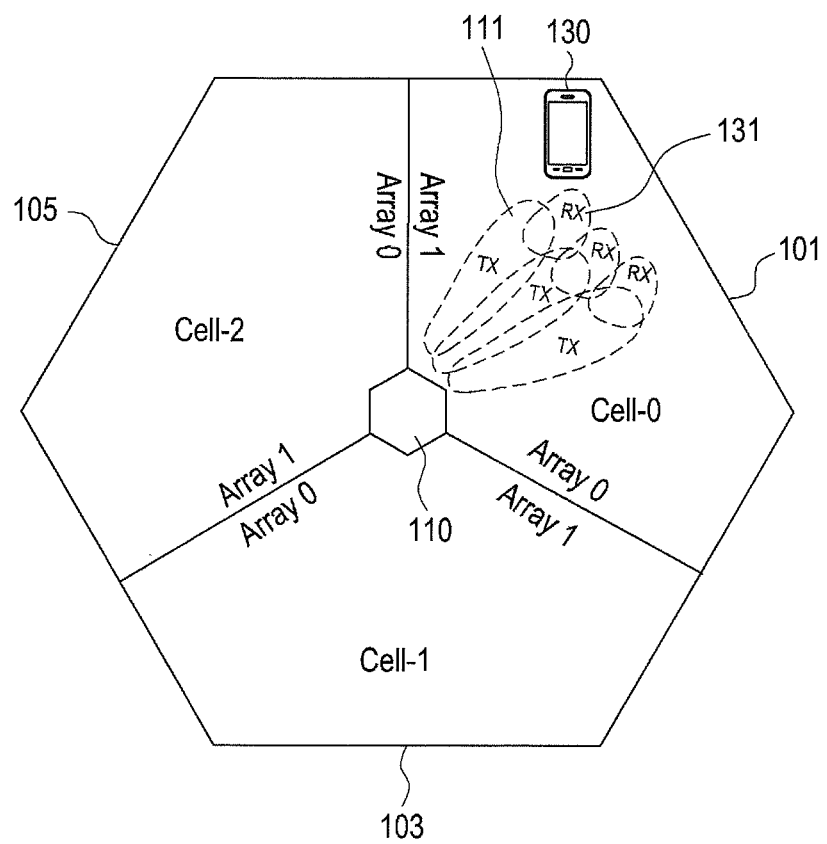
FIG. 1 illustrates a mobile communication system including a MS and a BS that provides beamforming using array antennas according to the present disclosure.
Figure 2:
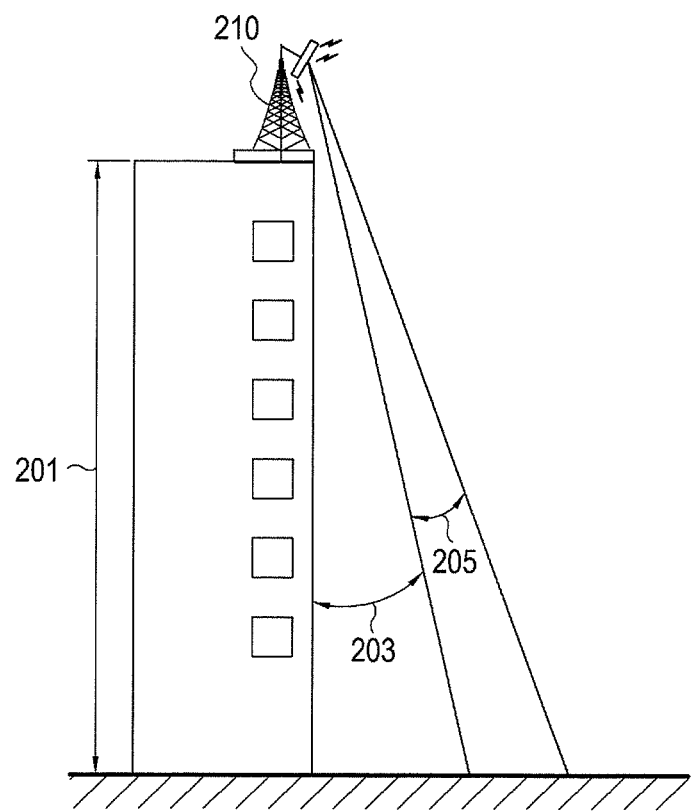
FIG. 2 illustrates a beam width, an elevation angle, and an azimuth in a mobile communication system using beamforming according to the present disclosure.
Figure 3:
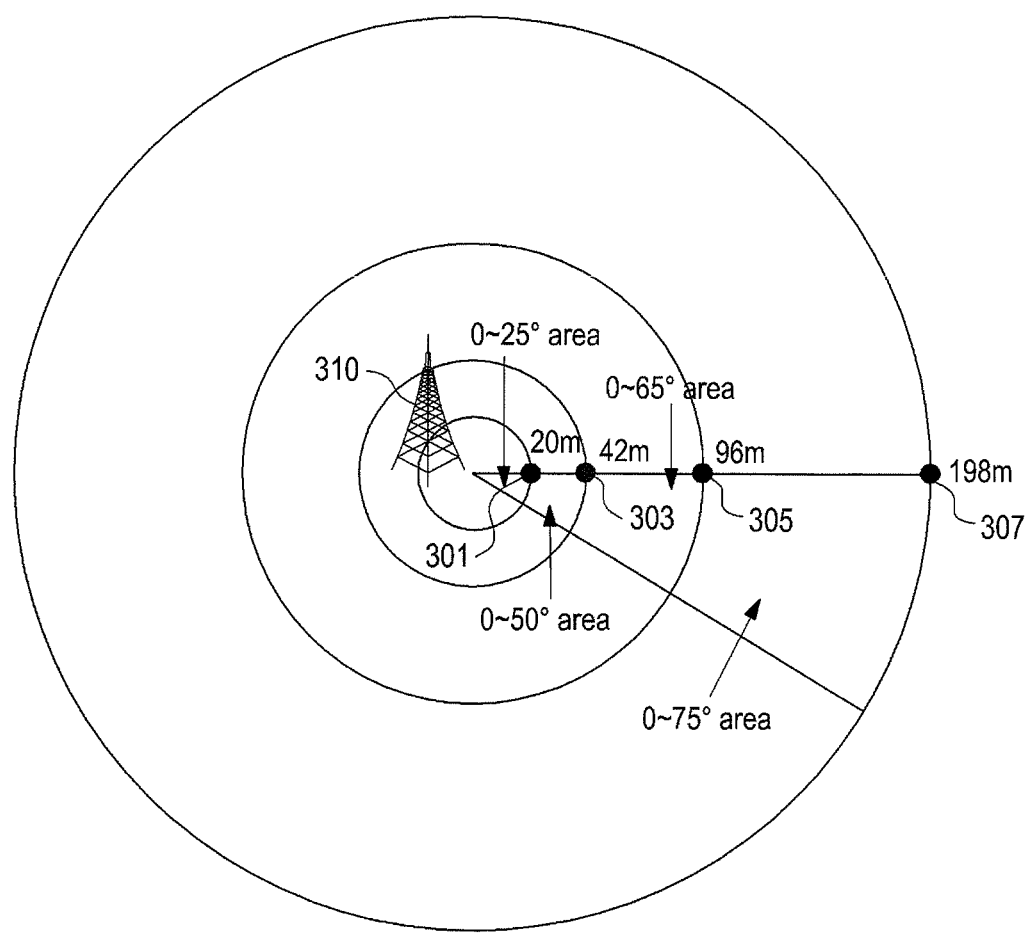
FIG. 3 illustrates an example of a range that a Tx beam reaches depending on the elevation angle in a mobile communication system using beamforming according to the present disclosure.

FIGS. 5 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of embodiments of the invention as defined by the claims and their equivalents. It includes various specific details to assist in that understanding but these are to be regarded as examples. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are used to enable a clear and consistent understanding of the disclosure. Accordingly, it should be apparent to those skilled in the art that the following description of embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the present disclosure include a method for efficiently transmitting a Downlink (DL) reference signal in a beamforming system.

To this end, an embodiments of the present disclosure include a method for efficiently transmitting a DL reference signal by adjusting a beam width of a DL Transmit (Tx) beam for data transmission in a Base Station (BS). Certain embodiments of the present disclosure include a method for efficiently transmitting a DL reference signal within the range where the number of DL Tx beams is less than or equal to the number of possible DL Tx beams.

In addition, certain embodiments of the present disclosure include a method for efficiently transmitting a DL reference signal using a beam width which is the same as or different from the width of the DL Tx beam that a BS uses for its data transmission. Certain embodiments of the present disclosure include a method for efficiently transmitting a DL reference signal by adjusting a Tx period (or Tx frequency) of the DL reference signal.

In certain embodiments of the present disclosure, a Mobile Station (MS) selects optimal DL Transmit/Receive (Tx/Rx) beams by receiving the DL reference signal that a BS transmitted after adjusting its beam width and/or Tx period (or Tx frequency) in the above-described manner.

Figure 5:
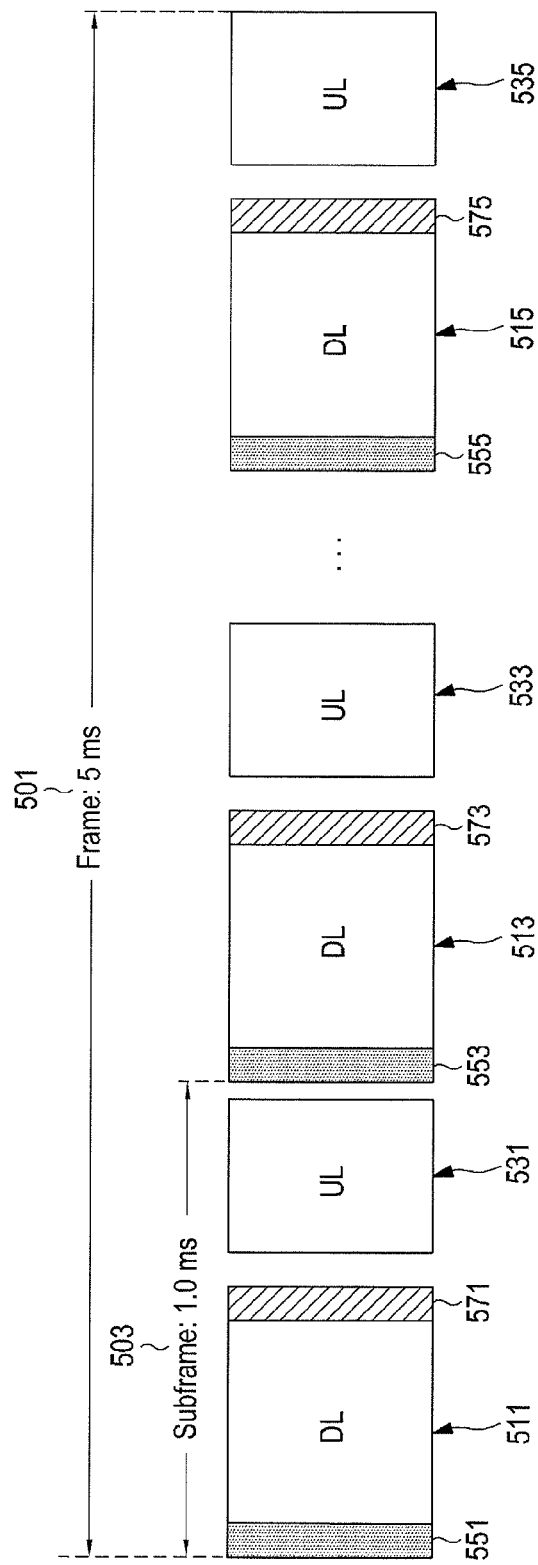
FIG. 5 illustrates an example of a frame structure in a mobile communication system using a beamforming technique according to embodiments of the present disclosure.

FIG. 5 illustrates an example of a frame structure in a mobile communication system using a beamforming technique according to embodiments of the present disclosure.

Referring to FIG. 5, for example, one frame 501 has a length of 5 ms, and includes five sub-frames 503. The length of the frame 501 and the number of sub-frames 503 in the frame 501 are illustrative for convenience, and they are not intended to limit the scope of the disclosure thereto.

The sub-frames 503 include DL Tx intervals 511, 513, . . . , 515 in which a BS transmits a signal to a MS, and Uplink (UL) Tx intervals 531, 533, . . . , 535 in which a MS transmits a signal to a BS. Referring to FIG. 5, some of the DL Tx intervals 511, 513, . . . , 515 are used as scheduling areas 551, 553, . . . , 555 for carrying scheduling information, and the other some of the DL Tx intervals 511, 513, . . . , 515 are used as Reference Signal (RS) areas 571, 573, . . . , 575 for carrying a DL reference signal.

Figure 4:
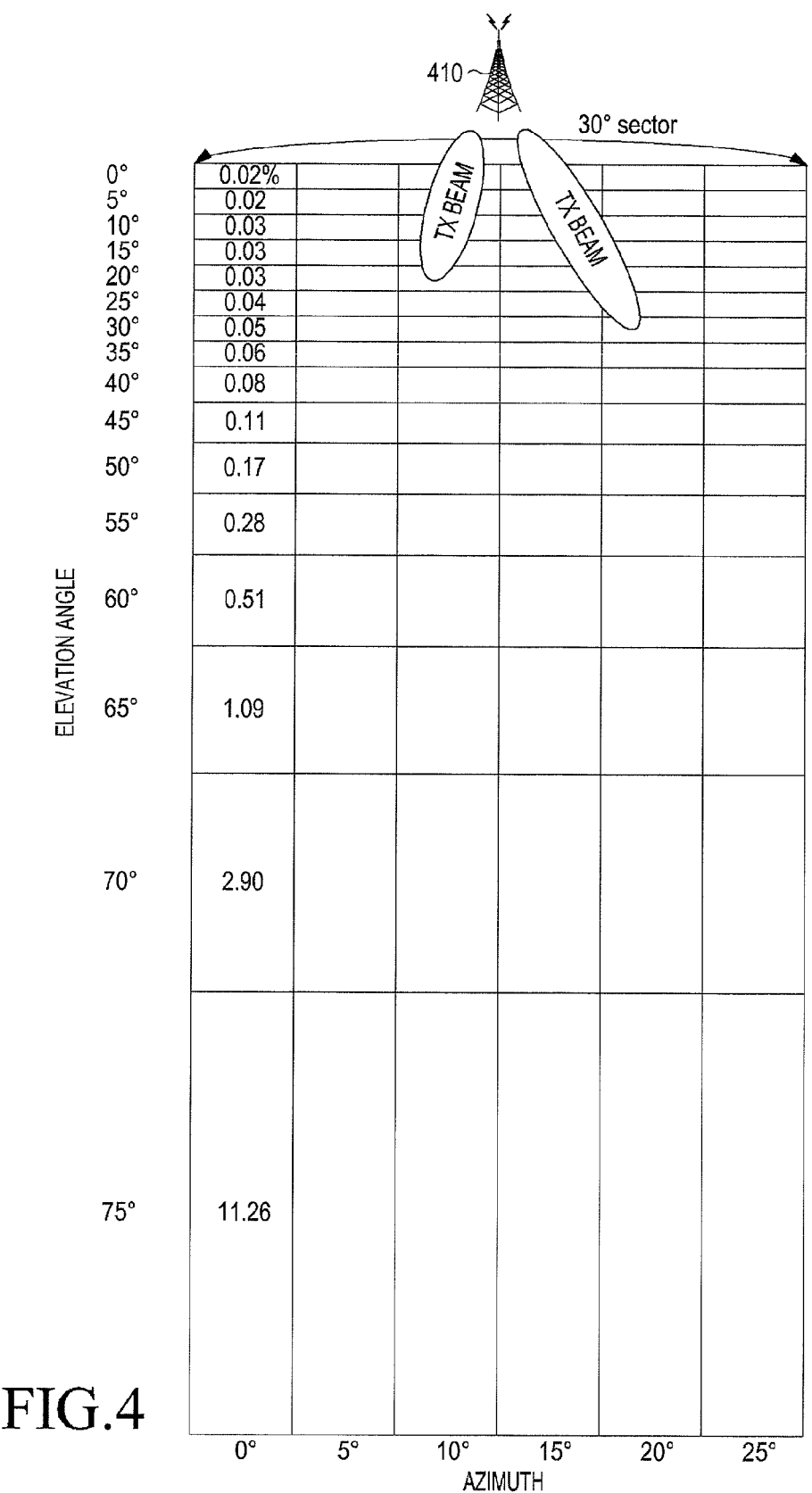
FIG. 4 illustrates the number of Tx beams that can be used by a BS depending on the elevation angle and the azimuth according to the present disclosure.

The amount of resources allocated to the DL RS areas 571, 573, . . . , 575 is proportional to at least one of the number of DL reference signals and the Tx period of the DL reference signals. For example, if a sector is configured using 96 Tx beams having a beam width of 5° with respect to each of the elevation angle and the azimuth as illustrated in FIG. 4, and a DL reference signal is transmitted once in every sub-frame, then sufficient resources should be allocated to the DL RS areas 571, 573, . . . , 575 so that the 96 Tx beams are transmitted.

Certain embodiments of the present disclosure separately define a beam width of a Tx beam for transmission of data and a beam width of a Tx beam for transmission of a reference signal, in order to efficiently transmit a DL reference signal.

Certain embodiments of the present disclosure provide a way to use beam widths, which are the same as or wider than that of a Tx beam for transmission of data, for transmission of a reference signal, and to minimize the amount of resources required to transmit a reference signal by using a plurality of different beam widths as a beam width of a Tx beam for transmission of a reference signal.

In addition, certain embodiments of the present disclosure include a method of transmitting a DL reference signal by setting a beam width of a Tx beam for reference signal transmission (hereinafter, RS transmission for short) so that the areas, in which Tx beams including a reference signal are received, are almost the same in terms of the size.

Further, certain embodiments of the present disclosure include a method of efficiently transmitting a DL reference signal in a way to use a narrower elevation-angle beam width if a Tx beam including a reference signal is transmitted to a region close to the boundary area of the BS, and to use a wider elevation-angle beam width if a Tx beam including a reference signal is transmitted to a region close to the central area of the BS.

Although it is assumed in the example of FIG. 4 that all DL Tx beams have the same beam width of 5° at the elevation angle and the azimuth, the below-described embodiment of the present disclosure provides, for example, a way to minimize the amount of resources consumed to transmit a reference signal, by using a Tx beam having a beam width of, for example, 5° at the elevation angle and the azimuth, for data transmission, and using a Tx beam having a beam width of 10° at the elevation angle and the azimuth, for RS transmission.

The beam width '5°' of a Tx beam for data transmission and the beam width '10°' of a Tx beam for RS transmission are illustrative for convenience of description, and the beam width for data transmission and the beam width for RS transmission can be set to a variety of different angles within a range meeting the conditions that the beam width for RS transmission is the same as or wider than the beam width for data transmission.

Figure 6:
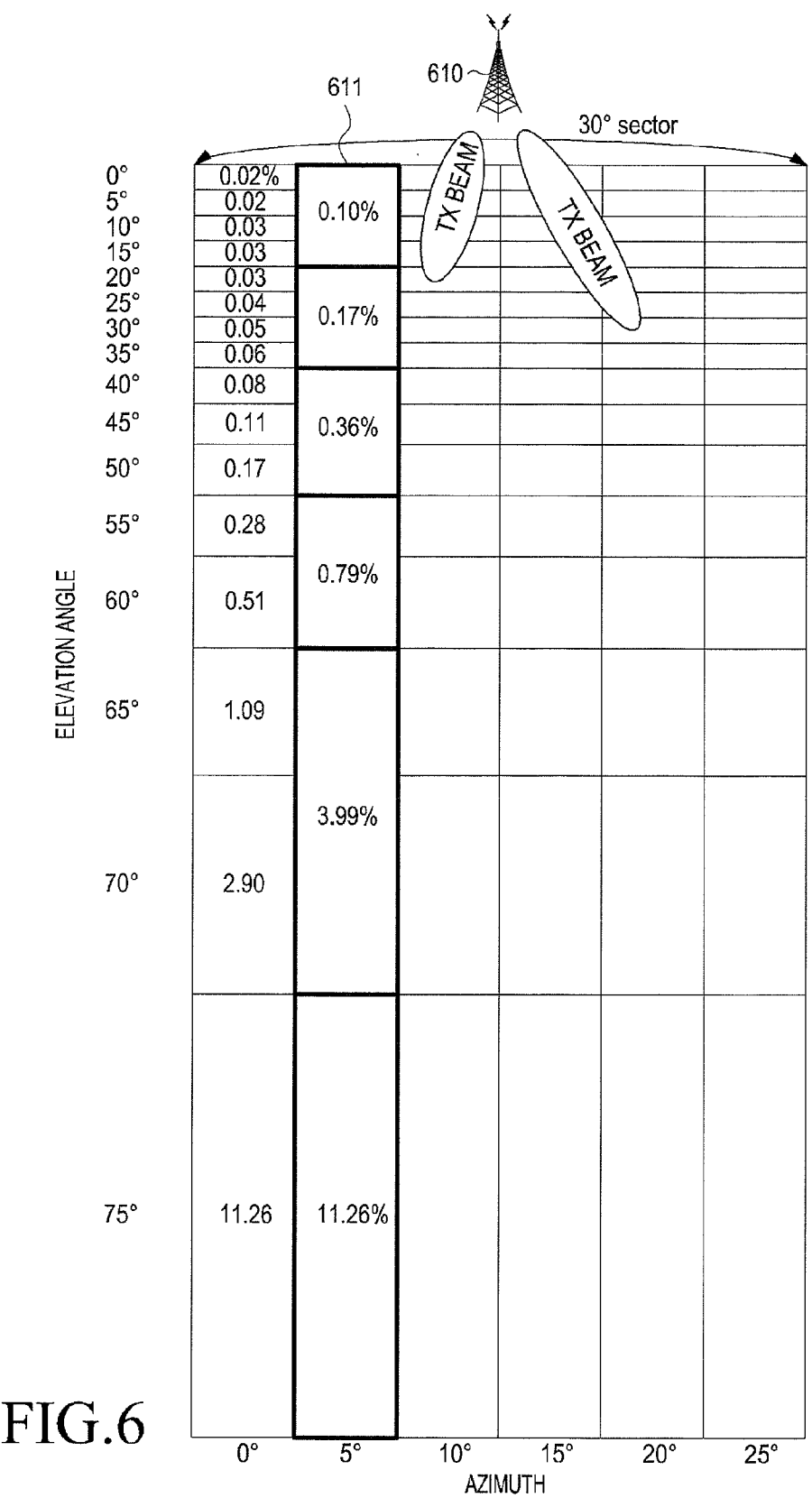
FIG. 6 illustrates an example of an RS transmission method according to embodiments of the present disclosure, compared to the example in FIG. 4.

FIG. 6 illustrates an example of an RS transmission method according to embodiments of the present disclosure, compared to the example in FIG. 4.

Referring to FIG. 6, reference numeral 611 represents the areas that a Tx beam for RS transmission reaches, the Tx beam for RS transmission having a plurality of beam widths which are different from that of a Tx beam for data transmission according to certain embodiments of the present disclosure. The other areas defined by a rectangle except for the areas 611 correspond to the areas that a Tx beam reaches, which has a beam width of for example, 5° at the elevation angle and azimuth as described in connection with FIG. 4.

It will be assumed in the example of FIG. 6 that a reference signal is transmitted using a Tx beam that has a beam width of an azimuth of 5° and beam widths of elevation angles of 5°, 10°, 15°, and 20°. In the example of FIG. 6, a Tx beam that is transmitted to a region close to the boundary area of the BS is transmitted using a narrower elevation-angle beam width and a Tx beam that is transmitted to a region close to the central area of the BS is transmitted using a wider elevation-angle beam width so that the regions, in which Tx beams including a reference signal are received, are similar to each other in terms of the width.

In other words, when transmitting a reference signal to an area covered by a Tx beam for data transmission, which is transmitted in a direction of an elevation angle of 0°~15° and has a beam width of 5°, the BS transmits a DL reference signal using one Tx beam for RS transmission, which has an elevation-angle beam width of 20°. When transmitting a reference signal to an area covered by a Tx beam for data transmission, which is transmitted in a direction of an elevation angle of 20°~35°, the BS transmits a DL reference signal using one Tx beam for RS transmission, which has an elevation-angle beam width of 20°.

In addition, when transmitting a reference signal to an area covered by a Tx beam for data transmission, which is transmitted in a direction of an elevation angle of 40°~50°, the BS transmits a DL reference signal using one Tx beam for RS transmission, which has an elevation-angle beam width of 15°. When transmitting a reference signal to an area covered by a Tx beam for data transmission, which is transmitted in a direction of an elevation angle of 55°~60°, the BS transmits a DL reference signal using one Tx beam for RS transmission, which has an elevation-angle beam width of 10°. When transmitting a reference signal to an area covered by a Tx beam for data transmission, which is transmitted in a direction of an elevation angle of 65°~70°, the BS transmits a DL reference signal using one Tx beam for RS transmission, which has an elevation-angle beam width of 10°. When transmitting a reference signal to an area covered by a Tx beam for data transmission, which is transmitted in a direction of an elevation angle of 75°, the BS transmits a DL reference signal using one Tx beam for RS transmission, which has an elevation-angle beam width of 5°. In the example of FIG. 6, a ratio written in each rectangle of the areas 611, in which a reference signal is transmitted, represents the ratio of an Rx area of the Tx beam transmitted to the location of the rectangle, to the entire area, in terms of the size.

Figure 7:
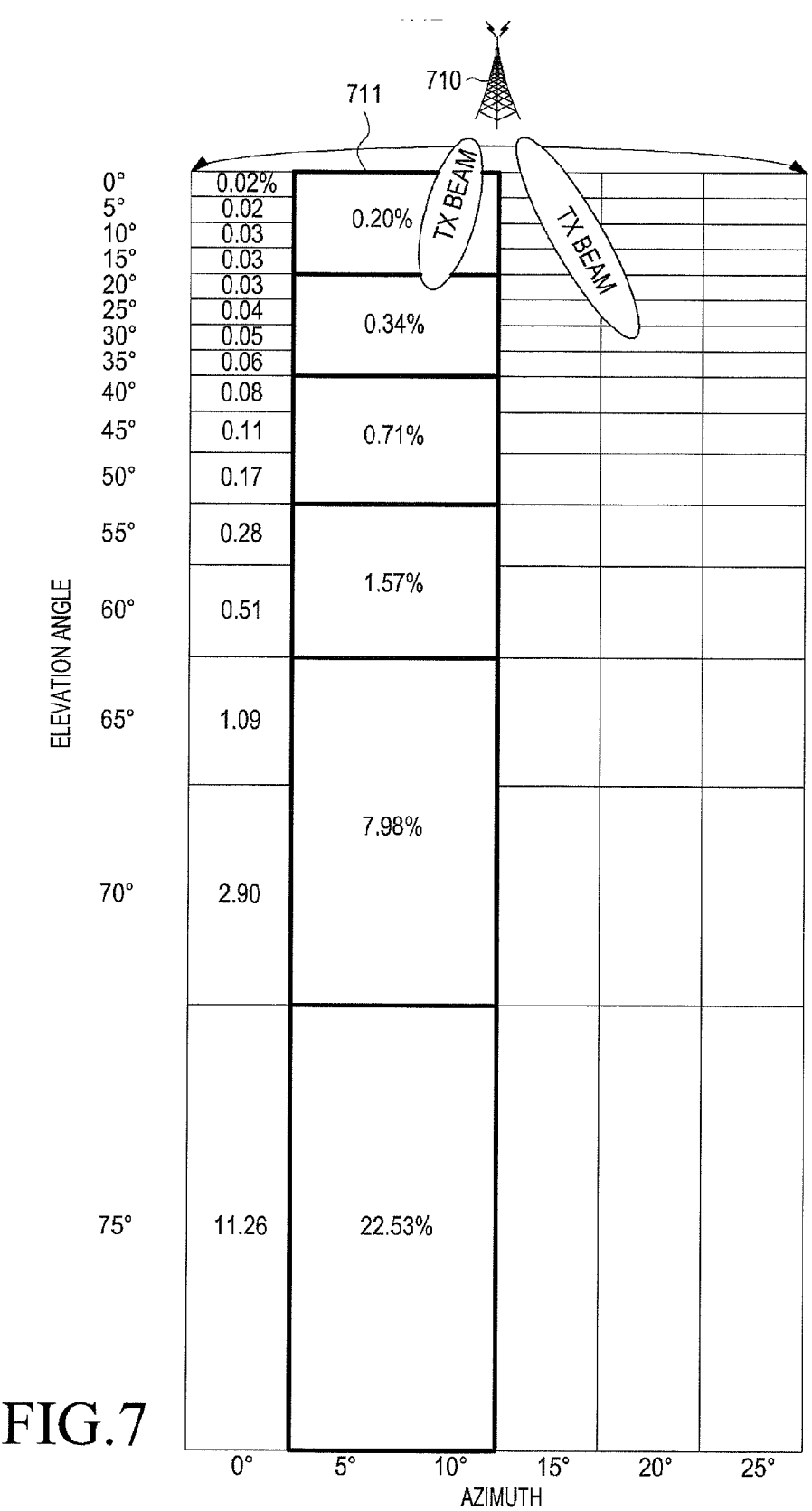
FIG. 7 illustrates another example of an RS transmission method according to embodiments of the present disclosure, compared to the example in FIG. 4.

FIG. 7 illustrates another example of an RS transmission method according to embodiments of the present disclosure, compared to the example in FIG. 4.

Referring to FIG. 7, reference numeral 711 represents the areas that a Tx beam for RS transmission reaches, the Tx beam for RS transmission having a plurality of beam widths which are different from that of a Tx beam for data transmission according to certain other embodiments of the present disclosure. The other areas defined by a rectangle except for the areas 711 correspond to the areas that a Tx beam reaches, which has a beam width of, for example, 5° at the elevation angle and azimuth as described in connection with FIG. 4.

It will be assumed in the example of FIG. 7 that a reference signal is transmitted using a Tx beam that has a beam width of an azimuth of 10° and beam widths of elevation angles of 5°, 10°, 15°, and 20°. The example of FIG. 7 is the same as that of FIG. 6 except that the azimuth-angle beam width of a Tx beam for RS transmission is 10°, so its detailed description will be omitted.

In the examples of FIGS. 6 and 7, the BS can simultaneously transmit two or more reference signals using two or more Tx beams, if it can simultaneously generate two or more Tx/Rx beams. The BS transmits the two or more Tx beams that include the two or more reference signals, using the same time-frequency resources. In this case, the BS transmits the two or more Tx beams using different code or sequence information, or transmits the two or more Tx beams into different spaces, making it possible for a MS to distinguish the reference signal included in each Tx beam.

The RS transmission method proposed by certain other embodiments of the present disclosure is to transmit a less number of Tx beams for RS transmission (hereinafter referred to as 'RS Tx beams) than Tx beams for data transmission (hereinafter referred to as 'data Tx beams) by setting a beam width of a Tx beam for transmitting a DL reference signal to be the same as or different from that of a Tx beam for transmitting the actual data.

Therefore, when a MS receives one RS Tx beam, there can be a plurality of data Tx beams corresponding to the RS Tx beam. Since a DL reference signal is the information that a MS uses to estimate the reception performance (or quality) of a DL data channel, or to select an optimal DL data Tx beam, the MS should calculate the estimated reception performance for each of a plurality of data Tx beams based on the received DL reference signal.

The MS uses, for example, interpolation as a method to calculate the performance of a data Tx beam using a lesser number of RS Tx beams. In other words, the MS selects an optimal data Tx beam and estimates the reception performance of the data Tx beam, using a distance ratio, an angle ratio, or a received signal strength ratio among a plurality of RS Tx beams for a Tx direction (i.e., azimuth and elevation angle), which correspond to data Tx beams for a specific Tx direction (i.e., azimuth and elevation angle). For example, in the example of FIG. 6, the MS calculates the estimated reception performance of data Tx beams corresponding to an azimuth of 5° and an elevation angle of 15° using interpolation by applying a distance ratio (or an angle ratio or a received signal strength ratio) with the data Tx beams to reception performance (at the central elevation angle of 10°; in the case of a size ratio of 0.10% in FIG. 6) of RS Tx beams corresponding to an azimuth of 5° and an elevation angle of 0°~20° and reception performance (at the central elevation angle of 30°; in the case of a size ratio of 0.17% in FIG. 6) of RS Tx beams corresponding to an azimuth of 5° and an elevation angle of 20°~40°.

The operation of calculating the reception performance of a data Tx beam using a less number of RS Tx beams can be performed in the BS. To this end, the MS measures reception performance for each of RS Tx beams, which are less in number than the data Tx beams, and reports the measurement results to the BS. The BS estimates the actual reception performance of the data Tx beams, using the reception performance of multiple RS Tx beams, ratio information thereof, and the distance ratio or angle ratio between the RS Tx beams that the MS has reported to the BS. For example, the above-described interpolation can be used for the estimation.

Figure 8:
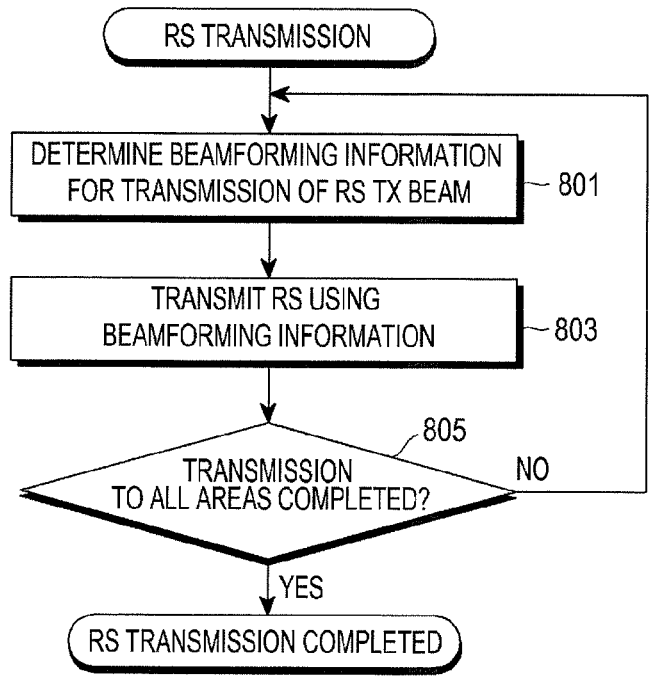
FIG. 8 illustrates a method for transmitting a reference signal in a BS according to embodiments of the present disclosure.

FIG. 8 illustrates a method for transmitting a reference signal in a BS according to embodiments of the present disclosure.

Referring to FIG. 8, in block 801, the BS determines, as beamforming information of an RS Tx beam, including at least one of, for example, a beam width of the RS Tx beam, a Tx direction (i.e., an elevation angle and an azimuth) in which the RS Tx beam is to be transmitted, and a time (or Tx order) at which the RS Tx beam is to be transmitted, taking into account the width or location of the area, in which the RS Tx beam is received, in the coverage of the BS, as described in connection with FIGS. 6 and 7. The beam width can be construed as a beam width at the Tx direction (i.e., an elevation angle and an azimuth). The time, at which the RS Tx beam is transmitted, is determined as, for example, a time which is determined depending on the scheduling of the BS. In certain embodiments of the present disclosure, the beamforming information optionally includes the Tx direction and the Tx time.

The beamforming information determined in block 801 is determined in advance between the BS and a MS, or may be dynamically changed each time the BS transmits an RS Tx beam. If the determination in block 801 is dynamically changed at every RS Tx time, the determined beamforming information of the RS Tx beam is delivered to a MS over, for example, a control channel or a broadcast channel, or by separate signaling, before the BS transmits a reference signal to the MS. In a case where the BS simultaneously transmits two or more reference signals using two or more Tx beams, beamforming information for the two or more Tx beams is determined in advance between the BS and a MS, or is dynamically changed each time the BS transmits an RS Tx beam.

Thereafter, in block 803, the BS transmits the RS Tx beam to a relevant Rx area among the Rx areas for Tx beams, which are defined in the coverage of the BS depending on the beamforming information determined in block 801, in the time-frequency domain which is allocated as the RS areas 571, 573, . . . , 575 as described in connection with FIG. 5. The BS determines in block 805 whether the BS has transmitted the reference signal to its all areas. If the BS has transmitted the reference signal to all areas of the BS, the BS completes the RS transmission operation. On the contrary, if the reference signal has not been transmitted to all the areas in block 805, the BS returns to block 801 to continue the transmission of the reference signal to the other areas to which the reference signal has not been transmitted.

Although it is assumed in certain embodiments that the operation of FIG. 8 is performed for all areas of the BS, the operation of FIG. 8 can be performed only for predetermined areas among the areas that the Tx beam of the BS can reach. In this case, in the other areas except for the predetermined areas, the reference signal will be transmitted in the another manner.

Figure 9:
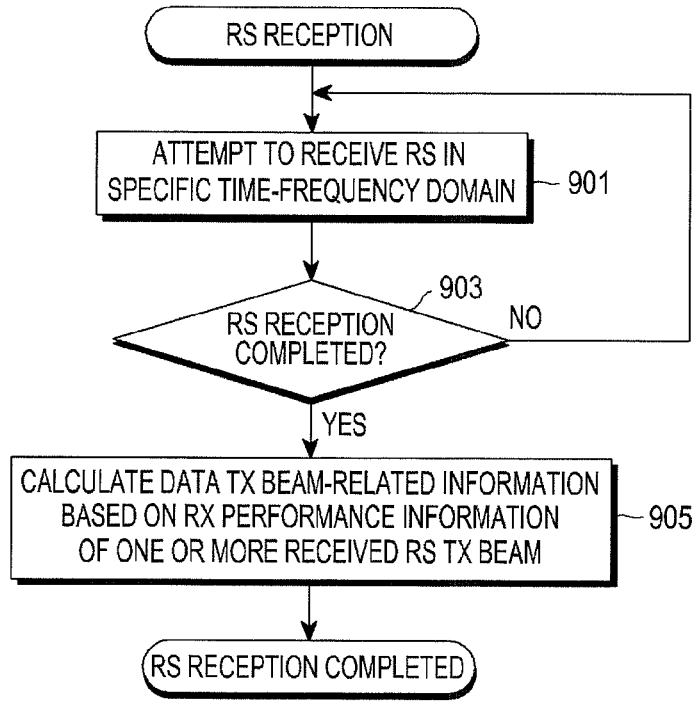
FIG. 9 illustrates a method for receiving a reference signal in a MS according to embodiments of the present disclosure.

FIG. 9 illustrates a method for receiving a reference signal in a MS according to the embodiments of the present disclosure.

Referring to FIG. 9, in block 901, the MS attempts to receive an RS Tx beam that a BS transmits depending on the beamforming information, in the specific time-frequency domain which is allocated as the RS Tx/Rx areas as described in connection with FIG. 5. The beamforming information, as described above, can be determined in advance between the BS and the MS, or can be delivered from the BS to the MS.

In block 903, the MS determines whether the reception of an RS Tx beam from the BS is completed. The MS repeats the reception operation of block 901 until the reception of all (or predetermined) RS Tx beams is completed. The MS may measure the reception performance of each received RS Tx beam.

Thereafter, in block 905, the MS selects an optimal data Tx beam (the reception performance of which is expected to be highest) or calculates the estimated reception performance of a specific data Tx beam in the above-described manner, based on the information about the reception performance measured for the plurality of received RS Tx beams. In FIG. 9, the data Tx beam-related information includes the reception performance (or estimated received strength) of the data Tx beam, which is estimated based on the reception performance of the RS Tx beam, using the interpolation for example. In an alternative embodiment, after calculating the estimated reception performance of the data Tx beam through the operation of FIG. 9, the MS additionally performs an operation of reporting the estimated value to the BS. In a system that allows the BS to calculate the estimated reception performance of the data Tx beam, the MS reports the reception formation information of the received RS Tx beam to the BS as, for example, feedback information, and based on this information, the BS calculates the estimated reception performance of the data Tx beam.

Certain embodiments of the present disclosure provide a method of efficiently transmitting a DL reference signal by varying a period (or frequency), at which a DL reference signal is transmitted, by a BS, taking into account its area where a DL Tx beam is received.

This embodiment, in which it is assumed that Tx beams have the same beam width, provides a method of more efficiently transmitting a DL reference signal by transmitting a DL reference signal that is transmitted through a Tx beam having a wider Rx area, in a shorter period (or at higher frequency) than a DL reference signal that is transmitted via a Tx beam having a narrower Rx area, based on the size of the area where a DL Tx beam is received.

In this embodiment, a MS selects optimal DL Tx/Rx beams by receiving the DL reference signal that is transmitted in different periods (or at different frequencies).

Figure 10:
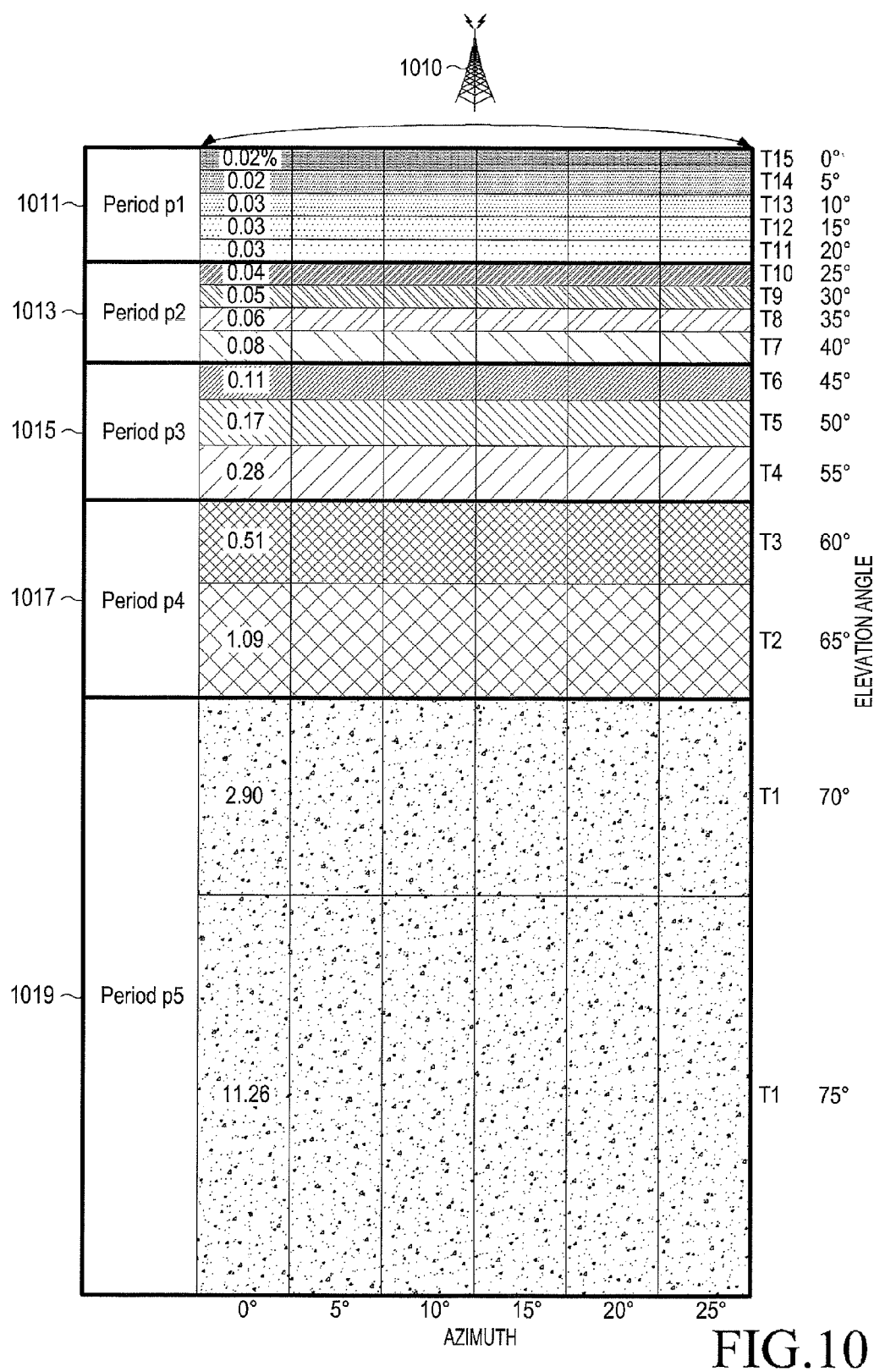
FIG. 10 illustrates an RS transmission method according to embodiments of the present disclosure, compared to the example in FIG. 4.

FIG. 10 illustrates an RS transmission method according to embodiments of the present disclosure, compared to the example in FIG. 4.

Referring to FIG. 10, the areas defined by a rectangle correspond to the areas that a data Tx beam reaches, which has a beam width of, for example, 5° at the elevation angle and azimuth like in FIG. 4, and which is transmitted by a BS 1010. In certain embodiments of the present disclosure, a DL reference signal is transmitted using an RS Tx beam having the same beam width as that of the data Tx beam, but different RS Tx periods (or frequencies) are used for different Tx beams taking into account the areas where the Tx beams are received.

In the example of FIG. 10, an RS Tx period (or frequency) p1 1011 is used for a Tx beam corresponding to an elevation angle of 0°~20°; an RS Tx period (or frequency) p2 1013 is used for a Tx beam corresponding to an elevation angle of 25°~40°; an RS Tx period (or frequency) p3 1015 is used for a Tx beam corresponding to an elevation angle of 45°~55°; an RS Tx period (or frequency) p4 1017 is used for a Tx beam corresponding to an elevation angle of 60°~65°; and an RS Tx period (or frequency) p5 1019 is used for a Tx beam corresponding to an elevation angle of 70°~75°. As to values of the periods p1~p5, a Tx period of a DL reference signal that is transmitted via a Tx beam having a wider area can be set as a shorter period (or higher frequency) than the Tx period of a DL reference signal for a Tx beam having a narrower area, based on the size of the area where a DL Tx beam is received. In other words, for example, p1, p2, p3, p4 and p5 can be set to 5 ms, 4 ms, 3 ms, 2 ms and 1 ms, respectively.

Figure 11:
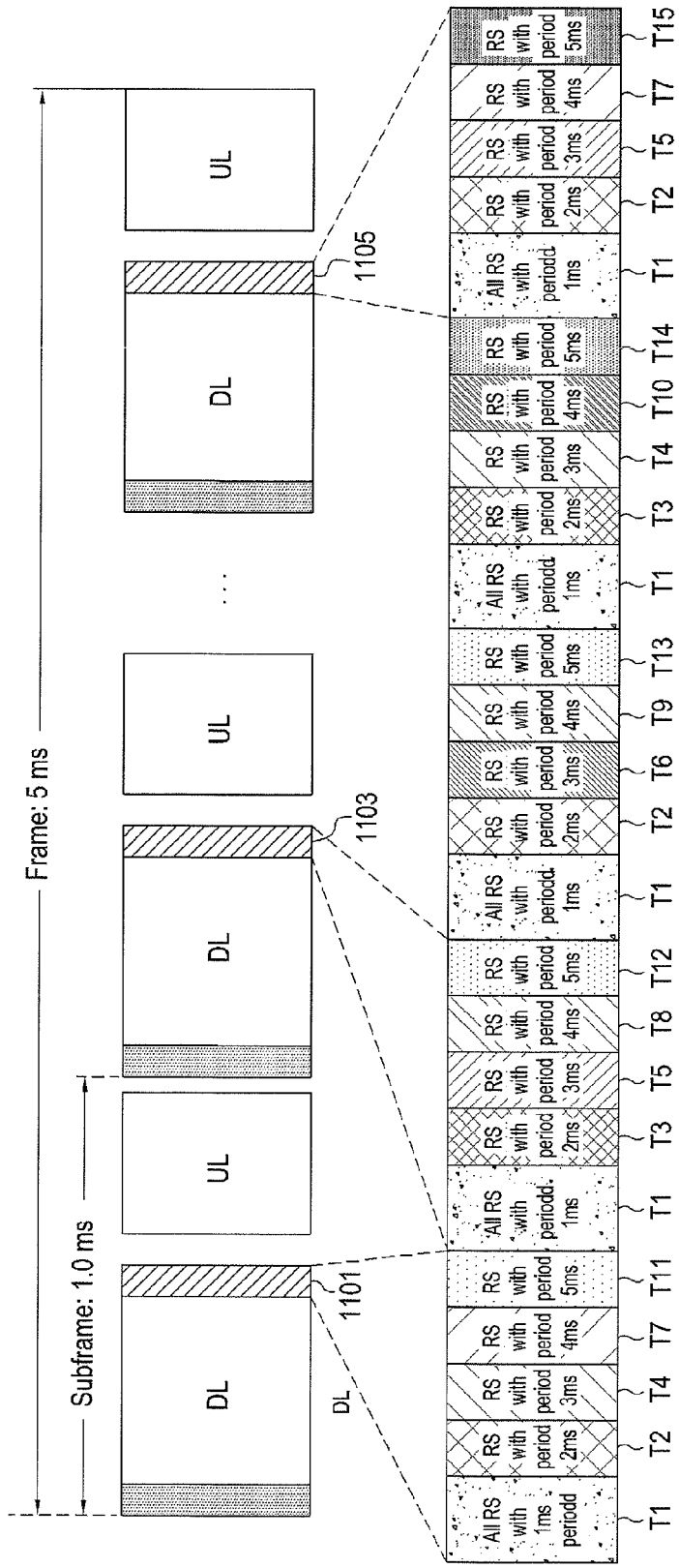
FIG. 11 illustrates the times at which DL reference signals having different periods are transmitted according to the embodiments of the present disclosure.

FIG. 11 illustrates the times at which DL reference signals having different periods are transmitted in the frame structure of FIG. 5, according to certain embodiments of the present disclosure.

Referring to FIG. 11, reference numerals 1101, 1103, . . . , 1105 represent the areas in which DL reference signals are transmitted, and the areas 1101, 1103, . . . , 1105 correspond to the RS areas 571, 573, . . . , 575 in FIG. 5. RSs are illustrated in the extended parts of the RS areas 1101, 1103, . . . , 1105 for the case where RS Tx periods p1, p2, p3, p4 and p5 are set to 5 ms, 4 ms, 3 ms, 2 ms and 1 ms as in FIG. 10, respectively, and the times T1 through T15, at which reference signals corresponding to the data Tx beams are transmitted in FIG. 10, are equally hatched-in at the corresponding times in FIG. 11.

In accordance with certain embodiments, DL reference signals having different periods p1~p5 are transmitted in the RS areas 1101, 1103, . . . , 1105 of the frame at different times as illustrated in FIG. 11.

In the examples of FIGS. 10 and 11, the BS simultaneously transmits two or more reference signals using two or more Tx beams, if the BS can simultaneously generate two or more Tx/Rx beams. The BS can transmit the two or more Tx beams that include the two or more reference signals, using the same time-frequency resources. In this case, the BS transmits the two or more Tx beams using different code or sequence information, or transmits the two or more Tx beams into different spaces, making it possible for a MS to distinguish the reference signal included in each Tx beam.

Figure 12:
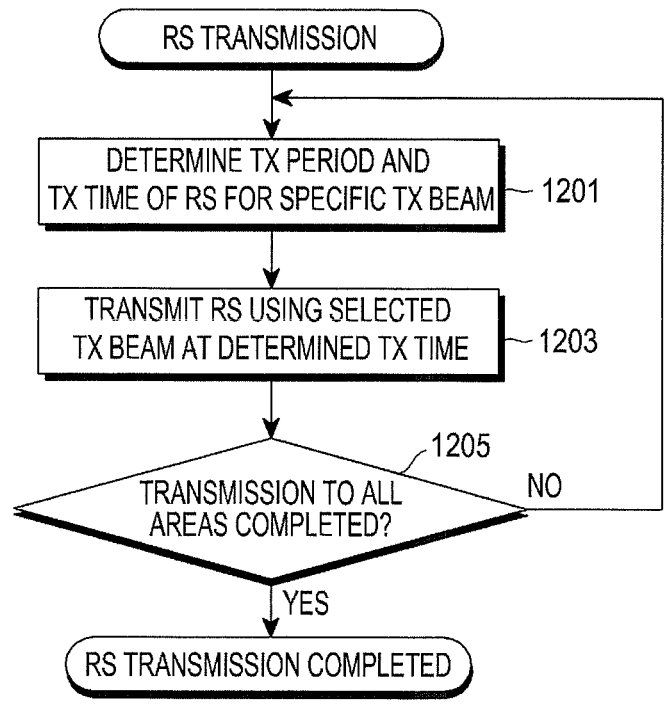
FIG. 12 illustrates a method for transmitting a reference signal in a BS according to the embodiments of the present disclosure.

FIG. 12 illustrates a method for transmitting a reference signal in a BS according to the embodiments of the present disclosure.

Referring to FIG. 12, in block 1201, the BS determines at least one of a Tx period and a Tx time (or Tx order) as beamforming information of a reference signal corresponding to a data Tx beam taking into account the area where the Tx beam is received, as described in connection with FIGS. 10 and 11. Although the beamforming information is determined to include at least one of a beam width, a Tx direction and a Tx time of a Tx beam in certain embodiments, only the Tx period and Tx time of a Tx beam are used according to certain other embodiments, excepting the beam width and the Tx direction presented in the former embodiment. In combination of the embodiments, at least one combination of information indicating the beam width, Tx direction, Tx period and Tx time of a Tx beam is determined as the beamforming information. For convenience of description, it will be assumed in the following description that the Tx period and Tx time are used according to certain embodiments of the present disclosure.

In block 1201, the Tx period and Tx time (or Tx order) of the reference signal is determined in advance between the BS and a MS, or is dynamically changed each time the BS transmits an RS Tx beam. If the determination in block 1201 is dynamically changed at every RS Tx time, the determined Tx period and Tx time (or Tx order) of the reference signal is delivered to the MS over, for example, a control channel or a broadcast channel, or by separate signaling, before the BS transmits a reference signal to the MS.

Thereafter, in block 1203, the BS transmits the reference signal to a relevant Rx area (i.e., an Rx area corresponding to each Tx beam) among the Rx areas of Tx beams, which are defined in the coverage of the BS depending on the beamforming information (i.e., Tx period and Tx time (or Tx order)) determined in block 1201, in the time-frequency domain which is allocated as the RS areas 1101, 1103, . . . , 1105 as described in connection with FIG. 11. In block 1205, the BS determines whether it has transmitted the reference signal to its all areas. If it has transmitted the reference signal to all the areas, the BS completes the RS transmission operation. On the other hand, if the reference signal has not been transmitted to all the areas in block 1205, the BS returns to block 1201 to continue the transmission of the reference signal to the other areas to which the reference signal has not been transmitted.

Although it is assumed in this example that the operation of FIG. 12 is performed for all areas of the BS, the operation of FIG. 12 can be performed only for predetermined areas among the areas that the Tx beam of the BS can reach. In this case, in the other areas except for the predetermined areas, the reference signal will be transmitted in another manner.

Figure 13:
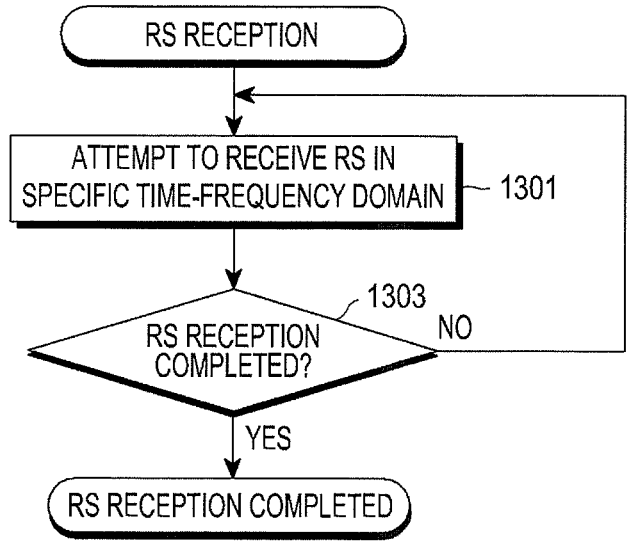
FIG. 13 illustrates a method for receiving a reference signal in a MS according to the embodiments of the present disclosure.

FIG. 13 illustrates a method for receiving a reference signal in a MS according to embodiments of the present disclosure.

Referring to FIG. 13, in block 1301, the MS attempts to receive an RS Tx beam that a BS transmits depending on the beamforming, information, in the specific time-frequency domain which is allocated as the RS Tx/Rx areas as described in connection with FIG. 11. The beamforming information, as described above, can be determined in advance between the BS and the MS, or can be delivered from the BS to the MS.

In block 1303, the MS determines whether the reception of the RS Tx beam from the BS is completed. The MS repeats the reception operation of block 1301 until the reception of all (or predetermined) RS Tx beams is completed. After receiving the RS Tx beam through the operation of FIG. 13, the MS calculates the estimated reception performance of the data Tx beam based on the received RS Tx beam. The MS additionally reports the estimated value to the BS. In a system that allows the BS to calculate the estimated reception performance of the data Tx beam, the MS reports the reception formation information of the received RS Tx beam to the BS, and based on this information, the BS calculates the estimated reception performance of the data Tx beam.

Figure 14:
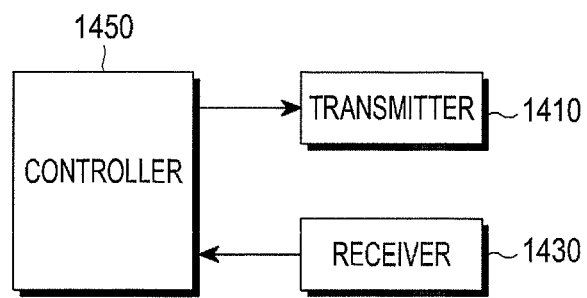
FIG. 14 illustrates a structure of a BS according to embodiments of the present disclosure.

FIG. 14 illustrates a structure of a BS according to embodiments of the present disclosure.

Referring to FIG. 14, the BS includes a transmitter 1410 for generating and transmitting a data Tx beam and an RS Tx beam, which are used to transmit data and a reference signal for reception of the data, to a MS over the wireless network, respectively, and a receiver 1430 for receiving a signal transmitted from the MS over the wireless network. In addition, the BS includes a controller 1450 for determining beamforming information indicating at least one of a beam width, a Tx direction, a Tx period and a Tx time of an RS Tx beam depending on the Rx area of a reference signal according to embodiments of the present disclosure as described in connection with FIGS. 5 to 13, and controlling the transmitter 1410 to transmit the RS Tx beam depending on the determined beamforming information. The controller 1450 controls the transmitter 1410 to transmit the determined beamforming information to the MS.

The detailed operation of the BS has been described with reference to FIGS. 8 and 12, so a detailed description thereof will be omitted.

Figure 15:
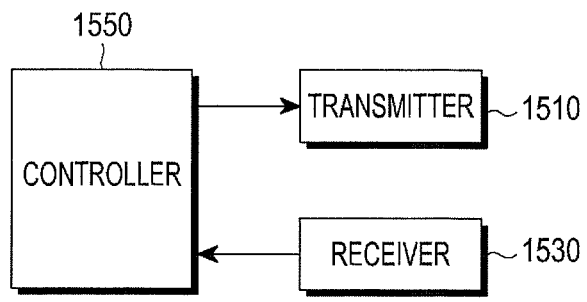
FIG. 15 illustrates a structure of a MS according to embodiments of the present disclosure.

FIG. 15 illustrates a structure of a MS according to embodiments of the present disclosure.

Referring to FIG. 15, the MS includes a transmitter 1510 for transmitting a signal to a BS over a wireless network, and a receiver 1530 for receiving a reference signal transmitted from the BS over the wireless network and receiving the data that is transmitted from the BS to correspond to the reference signal.

In addition, the MS includes a controller 1550 for receiving an RS Tx beam from the BS according to an embodiments of the present disclosure as described in connection with FIGS. 5 to 13, and controlling the receiver 1530 to receive a data Tx beam including data corresponding to the reference signal received via the RS Tx beam. In addition, the controller 1550 controls an operation of receiving beamforming information for reception of the RS Tx beam and receiving the RS Tx beam depending on the beamforming information. The detailed operation of the MS has been described with reference to FIGS. 9 and 13, so a detailed description thereof will be omitted.

Although the present disclosure has been described with examples, various changes and modifications may be suggested to one skilled in the art. It is intended that the present disclosure encompass such changes and modifications as fall within the scope of the appended claims.

What is claimed is:

1. A method for transmitting a reference signal (RS) by a base station (BS) in a mobile communication system using beamforming, the method comprising:
   determining beamforming information for transmission of a RS transmit (Tx) beam which is used for identifying an optimal data Tx beam by a mobile station (MS), wherein the beamforming information includes at least one of a Tx period and a beam width of the RS Tx beam which is determined based on sizes of receive (Rx) areas corresponding to a plurality of data Tx beams transmitted in coverage of the BS; and
   transmitting at least one RS Tx beam to related Rx areas using the determined beamforming information,
   wherein at least one of the Tx period and the beam width of the RS Tx beam is determined separately from the at least one of the Tx period and the beam width of a data Tx beam which is transmitted to an Rx area where the RS TX beam is transmitted.

2. The method of claim 1, wherein the sizes of the Rx areas increase in proportion to a distance from the BS to the Rx areas.

3. The method of claim 1, wherein the beamforming info' nation further includes at least one of a Tx direction and a Tx time of the RS Tx beam.

4. The method of claim 1, wherein the beam width of the RS Tx beam is determined to be inversely proportional to the size of the Rx area.

5. The method of claim 1, wherein the Tx period of the RS Tx beam is determined to be proportional to the size of the Rx area.

6. The method of claim 1, wherein the beam width of the RS Tx beam is equal to or wider than a beam width of the data Tx beam for Downlink (DL) data transmission.

7. The method of claim 1, wherein a number of RS Tx beams is determined to be equal to or less than a number of available DL Tx beams in coverage of the BS.

8. The method of claim 1, wherein the RS is transmitted in an RS area that is defined in a frame transmitted by the BS.

9. The method of claim 1, further comprising providing the determined beamforming information to the MS located in the coverage of the BS.

10. The method of claim 1, wherein the transmitting comprises transmitting two or more RS Tx beams using the same time-frequency resources.

11. The method of claim 10, wherein the two or more RS Tx beams transmitted using the same time-frequency resources are each distinguished by at least one of a code, a sequence and a space used during transmission of the two or more RS Tx beams.

12. The method of claim 1, further comprising:
   receiving reception performance information for the RS Tx beam from the MS that has received the RS Tx beam; and
   estimating reception performance of the data Tx beam using the received reception performance information.

13. The method of claim 12, wherein the reception performance of the data Tx beam is estimated using interpolation.

14. The method of claim 1, further comprising receiving information about reception performance of the data Tx beam from the MS that has received the RS Tx beam, the information estimated based on reception performance of the RS Tx beam.

15. A method for receiving a reference signal (RS) from a base station (BS) by a mobile station (MS) in a mobile communication system using beamforming, the method comprising:
   acquiring beamforming information for transmission of a RS transmit (Tx) beam which is used for identifying an optimal data Tx beam by the MS, wherein the beamforming information includes at least one of a Tx period and a beam width of the RS Tx beam which is determined based on sizes of receive (Rx) areas corresponding to a plurality of data Tx beams transmitted in coverage of the BS; and
   receiving at least one RS Tx beam including the RS using the acquired beamforming information,
   wherein at least one of the Tx period and the beam width of the RS Tx beam is determined separately from the at least one of the Tx period and the beam width of a data Tx beam which is transmitted to an Rx area where the RS Tx beam is transmitted.

16. The method of claim 15, wherein the sizes of the Rx areas increase in proportion to a distance from the BS to the Rx areas.

17. The method of claim 15, wherein the beamforming info nation further includes at least one of a Tx direction and a Tx time of the RS Tx beam.

18. The method of claim 15, wherein the beam width of the RS Tx beam is determined to be inversely proportional to the size of the Rx area.

19. The method of claim 15, wherein the Tx period of the RS Tx beam is determined to be proportional to the size of the Rx area.

20. The method of claim 15, wherein the beam width of the RS Tx beam is equal to or wider than a beam width of the data Tx beam for downlink (DL) data transmission.

21. The method of claim 15, wherein a number of RS Tx beams is determined to be equal to or less than a number of available DL Tx beams in the coverage of the BS.

22. The method of claim 15, wherein the RS is received in an RS area that is defined in a frame transmitted by the BS.

23. The method of claim 15, further comprising receiving the at least one RS Tx beam, and selecting the data Tx beam having highest reception performance based on signal strength of each RS Tx beam.

24. The method of claim 15, wherein the receiving comprises receiving two or more RS Tx beams transmitted using the same time-frequency resources.

25. The method of claim 24, wherein the two or more RS Tx beams transmitted using the same time-frequency resources are each distinguished by at least one of a code, a sequence and a space used during transmission of the two or more RS Tx beams.

26. The method of claim 15, further comprising:
   measuring reception performance of the RS Tx beam; and
   transmitting feedback information including the measured reception performance to the BS.

27. The method of claim 15, further comprising:
   measuring reception performance of the RS Tx beam;
   estimating reception performance of the data TX beam using the measured reception performance; and
   transmitting feedback information including the estimated reception performance of the data TX beam, to the BS.

28. The method of claim 27, wherein the reception performance of the data Tx beam is estimated using interpolation.

29. A base station (BS) for transmitting a reference signal (RS) in a mobile communication system using beamforming, the BS comprising:
a transmitter configured to transmit a RS transmit (Tx) beam including the RS and a data Tx beam including data corresponding to the reference signal; and
a controller configured to:
determine beamforming information for transmission of the RS Tx beam which is used for identifying an optimal data Tx beam by a mobile station (MS), wherein the beamforming information includes at least one of a Tx period and a beam width of the RS Tx beam which is determined based on sizes of receive (Rx) areas corresponding to a plurality of data Tx beams transmitted in coverage of the BS, and
control the transmitter to transmit at least one RS Tx beam to related Rx areas using the determined beamforming information,
wherein at least one of the Tx period and the beam width of the RS Tx beam is determined separately from the at least one of the Tx period and the beam width of the data Tx beam which is transmitted to an Rx area where the RS Tx beam is transmitted.

30. The BS of claim 29, wherein the sizes of the Rx areas increase in proportion to a distance from the BS to the Rx areas.

31. The BS of claim 29, wherein the beamforming information further includes at least one of a Tx direction and a Tx time of the RS Tx beam.

32. The BS of claim 29, wherein the beam width of the RS Tx beam is determined to be inversely proportional to the size of the Rx area.

33. The BS of claim 29, wherein the Tx period of the RS Tx beam is determined to be proportional to the size of the Rx area.

34. The BS of claim 29, wherein the beam width of the RS Tx beam is equal to or wider than a beam width of the data Tx beam for downlink (DL) data transmission.

35. The BS of claim 29, wherein a number of RS Tx beams is determined to be equal to or less than a number of available DL Tx beams in the coverage of the BS.

36. The BS of claim 29, wherein the RS is transmitted in an RS area that is defined in a frame transmitted by the BS.

37. The BS of claim 29, wherein the controller is configured to control an operation of providing the determined beamforming information to the MS located in the coverage of the BS.

38. The BS of claim 29, wherein the controller is configured to control an operation of transmitting two or more RS Tx beams using the same time-frequency resources.

39. The BS of claim 38, wherein the two or more RS Tx beams transmitted using the same time-frequency resources are each distinguished by at least one of a code, a sequence and a space used during transmission of the two or more RS Tx beams.

40. The BS of claim 29, wherein the controller is configured to control an operation of receiving reception performance information for the RS Tx beam from the MS that has received the RS Tx beam, and estimating reception performance of the data Tx beam using the received reception performance information.

41. The BS of claim 40, wherein the reception performance of the data Tx beam is estimated using interpolation.

42. The BS of claim 29, wherein the controller is configured to control an operation of receiving information about reception performance of the data Tx beam from the MS that has received the RS Tx beam, the information estimated based on reception performance of the RS Tx beam.

43. A mobile station (MS) for receiving a reference signal (RS) from a base station (BS) in a mobile communication system using beamforming, the MS comprising:
a receiver configured to receive, from the BS, beamforming information and a RS transmit (Tx) beam generated based on the beamforming information which is used for identifying an optimal data Tx beam by the MS, wherein the beamforming information includes at least one of a Tx period and a beam width of the RS Tx beam which is determined based on sizes of receive (Rx) areas corresponding to a plurality of data Tx beams transmitted in coverage of the BS; and
a controller configured to control the receiver to receive at least one RS Tx beam including the RS using the received beamforming information,
wherein at least one of the Tx period and the beam width of the RS Tx beam is determined separately from the at least one of the Tx period and the beam width of which is transmitted to an Rx area where the RS Tx beam is transmitted.

44. The MS of claim 43, wherein the sizes of the Rx areas increase in proportion to a distance from the BS to the Rx areas.

45. The MS of claim 43, wherein the beamforming information further includes at least one of a Tx direction and a Tx time of the RS Tx beam.

46. The MS of claim 43, wherein the beam width of the RS Tx beam is determined to be inversely proportional to the size of the Rx area.

47. The MS of claim 43, wherein the Tx period of the RS Tx beam is determined to be proportional to the size of the Rx area.

48. The MS of claim 43, wherein the beam width of the RS Tx beam is equal to or wider than a beam width of the data Tx beam for downlink (DL) data transmission.

49. The MS of claim 43, wherein a number of RS Tx beams is determined to be equal to or less than a number of available DL Tx beams in the coverage of the BS.

50. The MS of claim 43, wherein the RS is received in an RS area that is defined in a frame transmitted by the BS.

51. The MS of claim 43, wherein the controller is further configured to control an operation of receiving the at least one RS Tx beam and selecting the data Tx beam having highest reception performance based on signal strength of each RS Tx beam.

52. The MS of claim 43, wherein the controller is further configured to control an operation of receiving two or more RS Tx beams transmitted using the same time-frequency resources.

53. The MS of claim 52, wherein the two or more RS Tx beams transmitted using the same time-frequency resources are each distinguished by at least one of a code, a sequence and a space used during transmission of the two or more RS Tx beams.

54. The MS of claim 43, wherein the controller is configured to control an operation of:
measuring reception performance of the RS Tx beam, and transmitting feedback information including the measured reception performance to the BS.

55. The MS of claim 43, wherein the controller is further configured to control an operation of:
    measuring reception performance of the RS Tx beam,
    estimating reception performance of data TX beam using the measured reception performance, and
    transmitting feedback information, including the estimated reception performance of the data TX beam, to the BS.

56. The MS of claim 55, wherein the reception performance of the data Tx beam is estimated using interpolation.

* * * * *